Patented June 6, 1939

2,161,422

UNITED STATES PATENT OFFICE 2,161,422

STABLE THERAPEUTIC PRODUCTS FROM INTESTINAL MUCOUS MEMBRANE AND PROCESS OF PREPARING THEM

Carl Ludwig Lautenschläger, Fritz Lindner, and Rudolf Rigler, Frankfort-on-the-Main, and Otto Schaumann, Wiesbaden, Germany, assignors to Winthrop Chemical Company, Inc., New York, N. Y., a corporation of New York No Drawing. Application July 7, 1936, Serial No. 89,468. In Germany August 1, 1935

7 Claims. (Cl. 167—74)

The present invention relates to stable therapeutic products from intestinal mucous membrane and a process of preparing them.

As is known the intestinal mucous membrane has a depoisoning action on the poisons produced in the intestinal canal by bacterial and other cleavage processes. The nature of this depoisoning principle has not yet become clear. Partly the depoisoning is believed to be due to the histaminase present in the intestinal mucous membrane and disintegrating the histamine having a toxic action. A process of preparing therapeutically applicable products having a depoisoning action from intestinal mucous membrane has hitherto not been known, this being due to the fact that the extracts obtained from the intestinal mucous membrane become ineffective already after a short time owing to bacterial and other decompositions.

Now we have found that stable therapeutically applicable highly-active products may be obtained from the intestinal mucous membrane by treating moist intestinal mucous membrane with a buffer solution, filtering the mixture, adding a water-soluble organic solvent to the filtrate and isolating the precipitate obtained. In order to avoid a premature destruction of the active substance, it is advisable to treat the intestinal mucous membrane, immediately after it has been obtained, with a disinfecting agent and then to freeze it. The starting material thus treated may then be subjected at any desired period to the action of the buffer solution as described above. For the previous treatment of the mucous membrane there may be used mucous membranes from animals directly after they have been slaughtered, or a waste mucus obtained after the entrails have been preliminarily soaked with cold water. As disinfectants there may be used the most varied substances, for instance complex mercury compounds, amines of higher fatty acids and others.

If the intestinal mucus has been treated with the buffer solution, as described above, and an organic, water-soluble solvent has been added to the filtered solution, the active substances and part of the buffer substance used precipitate and may be isolated by filtration or centrifugation. The essential feature of the process, therefore, consists in the following: by the treatment of the organic material with a buffer solution and precipitation of the solutions obtained with a water-soluble organic solvent, a considerable purification of the active substances is attained and the substances thus purified are precipitated on the buffer substance used, i. e., on a carrier substance, the stability of the product being considerably increased thereby.

When treating the intestinal mucous membrane with buffer solutions there is preferably chosen a neutral to weakly alkaline hydrogen ion concentration. The treatment may first be carried out for a prolonged time at a low temperature and finally at a raised temperature not exceeding 45° C. For obtaining products which are free from germs it is advantageous to filter the solutions containing the active substances with bacterial filters or so-called Seitz filters.

The yield may still be increased by previously cooling the water-soluble organic solvents used for the precipitation of the active substances below 0°, for instance to —5° C. to —10° C. In order to obtain entirely pure products it may be advisable to re-dissolve the precipitated products in buffer solutions and to mix these solutions either again with water-soluble organic solvents or to bring them to dryness, preferably after the previous concentration, by a distillation under reduced pressure, by particularly careful processes, for instance by using vacuum roller dryers, by atomization under reduced pressure or by drying under extremely reduced pressure in the frozen state.

As buffer substances there may be used the usual substances of this class, for instance sodium phosphate buffer, ammonium chloride buffer, ammonia buffer, glycocoll buffer and others. To these buffer solutions suitable substances, such as glycerine and others may be added. As water-soluble organic solvents there may be used, for instance, aliphatic ketones of low molecular weight, such as acetone, methyl ethyl ketone, ethers of polyhydric alcohols, such as glycol monoethyl ether, glycerin monoethyl ether and others.

It has been furthermore found that the process is not limited to the use of fresh intestinal mucous membrane; with the same success there may also be used the mucous membranes obtained as waste products in the process of freeing from the mucus the entrails destined for use as sausage casings.

The products obtained according to the present process are soluble in water and may be given per os or parenterally. The products may be standardized to an exactly defined effective value by the determination of the histamine destruction or by the destruction of the H-substance (anaphylactic poison) or in prophylactic animal tests by preventing the anaphylactic shock during the reinjection in sensitized animals.

Furthermore, the products possess the property of lowering the normal amino acid level in the blood and particularly that raised owing to illness on whose patho-physiologic importance there exist detailed statements, for instance in "Handbuch de Biochemie", supplementary part, vol. 3, 1936, in a report by Gottschalk. Furthermore the products thus obtained may lower the xantho-protein level in the blood raised owing to an increased resorption of slags of metabolism or owing to an incomplete depoisoning in the small intestine, as this may occur in a series of diseases, for instance rheumatism and diseases of the liver.

The following examples serve to illustrate the invention, but they are not intended to limit it thereto:

1. 50 kilograms of mucous membrane from fresh hog's small intestines are stirred, immediately after they have been obtained, with an aqueous solution of 100 grams of a mixture, half of which consists of sodium chloride and the other half of which consists of the hydrochloride of the mixture of amine obtainable from palm nut oil fatty acid; the mixture is then frozen. After the whole has been ground in the meat-chopping machine it is stirred during one night at a low temperature with 100 liters of n/10 phosphate buffer (pH about 7.4) and then a further hour at 38° C. The mixture is then centrifuged and the solution is filtered through a degerminating filter, for instance a so-called Seitz filter. The filtrate is cooled and precipitated with 1.5 times the volume of acetone previously cooled to —5° C. The precipitate obtained is centrifuged at once, washed twice each with acetone and ether and dried under reduced pressure.

2. 50 kilograms of mucous membrane as it is obtained during the treatment of intestinal mucus after a pre-soaking in ice-cold water are worked up as described in Example 1. The dry product obtained is again dissolved in a phosphate buffer, the solution is filtered through a Seitz filter and pre-concentrated under reduced pressure to about 1/10; the temperature is not raised about 20° C. during this operation; the concentrate thus obtained is dried in the frozen condition under reduced pressure. There is obtained a very loose, not hygroscopic powder which is very readily soluble in water to a clear solution.

We claim:

1. The process which comprises treating intestinal mucous membrane with a neutral to weakly alkaline buffer solution, filtering the mixture, adding a water-soluble organic solvent capable of precipitating the desired preparations to the filtrate and isolating the precipitate, every step of the process being carried out at a temperature not exceeding 45° C.

2. The process which comprises disinfecting and freezing intestinal mucous membrane, comminuting the frozen product, then treating it with a neutral to weakly alkaline buffer solution, filtering the mixture, adding a water-soluble organic solvent capable of precipitating the desired preparations to the filtrate and isolating the precipitate, every step of the process being carried out at a temperature not exceeding 45° C.

3. The process which comprises disinfecting and freezing intestinal mucous membrane, comminuting the frozen product, then treating it with a neutral to weakly alkaline buffer solution, filtering the mixture, adding a water-soluble organic solvent capable of precipitating the desired preparations to the filtrate, isolating the precipitate, redissolving it in the buffer solution and carefully removing the water from the solution thus obtained, every step of the process being carried out at a temperature not exceeding 45° C.

4. The process which comprises disinfecting and freezing intestinal mucous membrane, comminuting the frozen product, then treating it with a neutral to weakly alkaline buffer solution, filtering the mixture through a bacterial filter, adding acetone to the filtrate and isolating the precipitate, every step of the process being carried out at a temperature not exceeding 45° C.

5. The products obtained by treating intestinal mucous membrane with a neutral to weakly alkaline buffer solution, filtering the mixture, adding a water-soluble organic solvent capable of precipitating the desired amount to the filtrate and isolating the precipitate, said products being white powders, soluble in water and showing a depoisoning action, every step of the process being carried out at a temperature not exceeding 45° C.

6. The process which comprises treating intestinal mucous membrane with a neutral to weakly alkaline buffer solution, filtering the mixture, adding acetone to the filtrate and isolating the precipitate, every step of the process being carried out at a temperature not exceeding 45° C.

7. The products obtained by treating intestinal mucous membrane with a neutral to weakly alkaline buffer solution, filtering the mixture, adding acetone to the filtrate and isolating the precipitate, every step of the process being carried out at a temperature not exceeding 45° C.

CARL LUDWIG LAUTENSCHLÄGER.
FRITZ LINDNER.
RUDOLF RIGLER.
OTTO SCHAUMANN.